United States Patent
Bridge, Jr. et al.

(10) Patent No.: US 6,272,503 B1
(45) Date of Patent: Aug. 7, 2001

(54) TABLESPACE-RELATIVE DATABASE POINTERS

(75) Inventors: William H. Bridge, Jr., Alameda; Jonathan D. Klein, Pleasanton; J. William Lee, Foster City; Juan R. Loaiza, San Carlos; Alex Tsukerman, Foster City; GianFranco Putzolu, San Francisco, all of CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 08/865,693

(22) Filed: May 30, 1997

(51) Int. Cl.[7] .................................................. G06F 17/30
(52) U.S. Cl. .................... 707/204; 707/101; 707/200; 711/1; 711/3; 711/202; 711/209
(58) Field of Search ..................... 707/200–206, 707/100, 101; 711/1, 2, 3, 202, 209

(56) References Cited

U.S. PATENT DOCUMENTS

| 5,454,101 | * | 9/1995 | Mackay et al. ................ 707/200 |
| 5,551,020 | * | 8/1996 | Flax et al. ..................... 707/101 |
| 5,787,445 | * | 7/1998 | Daberko ........................ 707/205 |
| 5,787,446 | * | 7/1998 | Dang et al. .................... 707/205 |

* cited by examiner

Primary Examiner—Thomas G. Black
Assistant Examiner—Hosain T. Alam
(74) Attorney, Agent, or Firm—Ditthavong & Carlson P.C.

(57) ABSTRACT

A database containing datafiles is partitioned into a set of tablespaces. Every disk pointer pointing to a data item in a datafile refers to a tablespace-relative file number for the datafile. Data pointed to by a tablespace-relative disk pointer is retrieved by first checking the cache, and upon a cache miss, the tablespace-relative file number is translated into an absolute file number according to a latch-free look up technique.

19 Claims, 16 Drawing Sheets

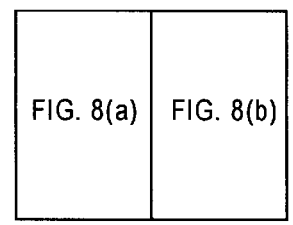
FIG. 8
FIG. 8(a)
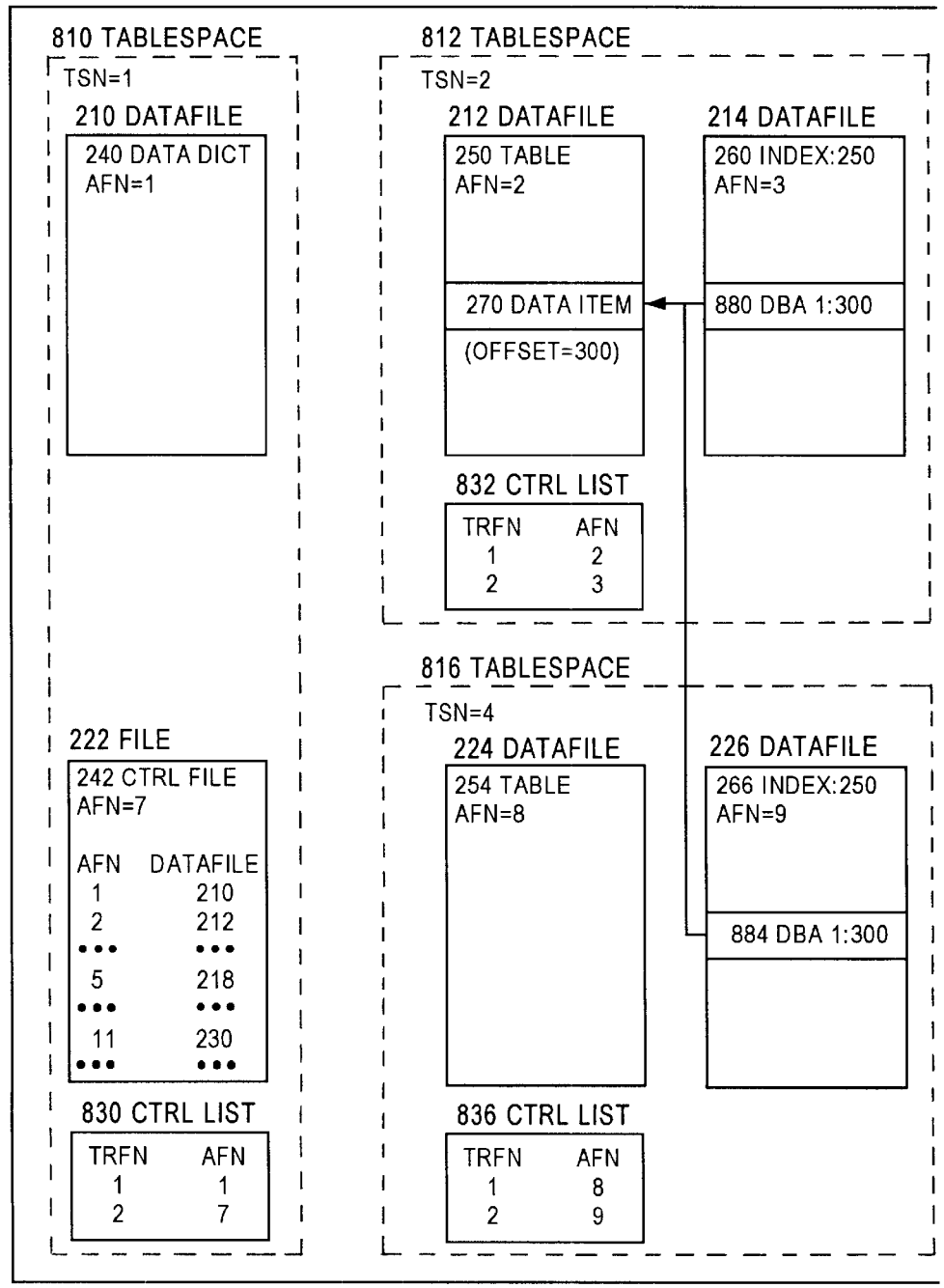

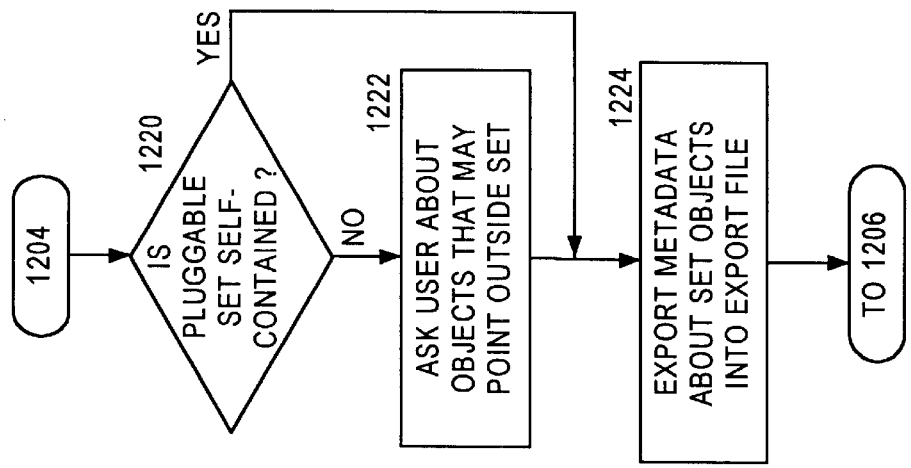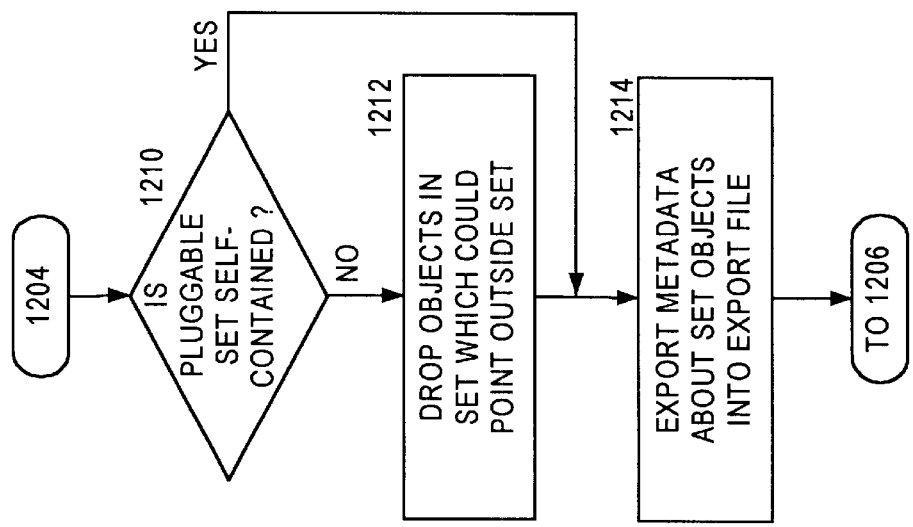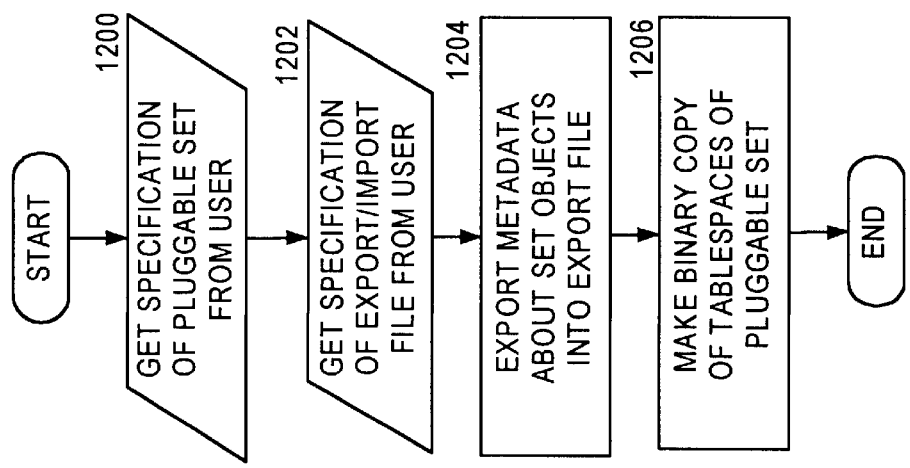

TABLESPACE-RELATIVE DATABASE POINTERS

RELATED APPLICATIONS

The present application is related to the following applications:

U.S. patent application Ser. No. 08/852,968 entitled "Pluggable Tablespaces for Database Systems," filed by William H. Bridge, Jr., Jonathan D. Klein, J. William Lee, Juan R. Loaiza, Alex Tsukerman, Gianfranco Putzolu on May 8, 1997, (now U.S. Pat. No. 5,890,167 issued Mar. 30, 1999), incorporated herein by reference; and U.S. patent application Ser. No. 08/846,511 entitled "Pluggable Tablespaces on a Transportable Medium," filed by William H. Bridge, Jr., Jonathan D. Klein, J. William Lee, Juan R. Loaiza, Alex Tsukerman, Gianfranco Putzolu on Apr. 29, 1997, (now U.S. Pat. No. 5,873,102 issued Feb. 16, 1999), incorporated herein by reference.

FIELD OF THE INVENTION

The present invention relates to computer systems and more specifically to retrieving data from computer databases.

BACKGROUND OF THE INVENTION

One of the most important functions of computers in today's society is their ability to store and retrieve a large amount of data in collections known as computer databases. In order to effectively manage these computer databases, the organization of the databases must be carefully designed.

Some databases, such as relational databases, store their information in indexed tables. Thus, a relational database contains two fundamental kinds of objects: tables, which contain the user data, and non-table objects, such as indexes, which keep track of administrative information to keep the database system running smoothly.

An object may be partitioned or non-partitioned. A non-partitioned object is stored in a single operating system file, called a datafile. A partitioned object is usually much larger and is stored in more than one datafile. When a datafile is added to a database, it is assigned an "absolute file number" which is unique throughout the entire database. The absolute file number of a datafile is an index of the corresponding entry in a control file, which contains operating system specific information about that datafile, such as the operating system file name.

A table object, which houses user data, is divided into one or more data blocks, containing one or more records (called "rows"). Rows contain one or more columns, which contain the specific information, such as a customer's name or automobile part number, the user stores. Since every data block belongs to some datafile, it is natural to identify each block by the absolute file number to which the data block belongs and by the file offset of the data block. The absolute file number provides an easy way to locate the operating specific information necessary to open the datafile, and it is efficient to access a data block within an opened datafile by the file offset.

As a result, the combination of the absolute file number and the file offset forms a readily useable absolute data block address ("absolute DBA") as a way to make a reference to any particular data block within the database system. An "absolute disk pointer" is a data structure that stores an absolute DBA as a pointer to a data block.

With reference to FIG. 2, database 200 contains ten objects: data dictionary 240; control file 242; five tables of user data, 250 to 258; and five index files, 260, to 268, built upon tables 250 to 258, respectively. Each object is stored a datafile, 210 to 220 and 224 to 232, and assigned a unique absolute file number (AFN) of 1 to 12, respectively. Data item 270 is found in table 250, stored at offset 300 in datafile 212 having an AFN of 2. Both index files 260 and 266 are built on table 250 and both contain an absolute disk pointer, 280 and 284 respectively, pointing to data item 270 and having an absolute DBA of 2:300. Given a disk pointer with an absolute DBA of 2:300, the corresponding data item is fetched by looking up the AFN in control file 242 to find the name of datafile 212 and other operating system specific information. With that information, datafile 212 is opened, and the block at offset 300 is retrieved. Similarly, absolute disk pointer 282 in index 268 has an absolute DBA of 11:200, pointing to data item 272 in table 258.

There are usually very many disk pointers in a database. Because reading a data item from a disk is fairly slow, the most used data items are stored in a main-memory cache. Given a disk pointer, containing an absolute file number and a file offset, the process for retrieving a data item according to the disk pointer is shown in the flow chart of FIG. 3. After a disk pointer is read containing an absolute file number AFN (step 300), execution proceeds to step 310, checking the cache for the data item according to the AFN and the file offset of the disk pointer. If the data item is not found in the cache, called a "cache miss," execution branches to step 320, where the datafile corresponding to the AFN is opened using the information stored in the control file for the AFN. The opening step is needed on only the first cache miss and does not have to be reduce on following cache misses. Then the data item at the file offset indicated by the file offset portion of the disk pointer is fetched from the opened data file (step 330). The data item is next inserted into the cache (step 340). On the other hand, if there is a cache hit the data item is simply retrieved from the cache (step 350) without reading the disk.

The maximum convenient size for a number on a digital computer is determined by the word size used by the computer. For example, if a computer has a 32-bit word size, it is convenient to handle numbers that are 32 bits in size, that is less than $2^{32}$ or 4,294,967,296. Integers larger than the word size become cumbersome to handle, because they require an additional word to store their value, and additional computing cycles to read, write, and compare the extra word. Consequently, some early database systems limited the total size of a disk pointer to the size of the word supported by the computer platform on which the database resides.

When the disk pointer is limited to 32 bits, the limiting factor for the number of datafiles in a database is not the number of file entries available in a control file, 32 bits, but the number of bits allocated for the absolute file number in a disk pointer, which can be significantly smaller. For example, in a computer system with 32-bit words, the absolute file number can be set at 10 bits and the file offset at 22 bits. The 10-bit absolute file number in a disk pointer would specify up to only 1024 unique datafiles, a number which limits very large computer databases. To circumvent this problem, a conventional approach is to allocate more bits for the absolute file number in the disk pointer.

Upgrading existing databases is a problem if the number bits allocated to an absolute disk pointer is increased. A database typically has a very large number of disk pointers. These existing disk pointers may no longer hold unused space for expansion, making it impossible to both increase the address space of absolute disk pointers and maintain upward compatibility. If upward compatibility is not maintained, then users will have to export and import existing databases, which are very time consuming procedures.

Another drawback to the use of absolute file numbers is that absolute file numbers make the transfer of a group of datafiles between two databases more difficult. Each absolute file number within a database is unique, but absolute file numbers are not unique between two different computer databases. As a result, a disk pointer in one computer database may contain the same absolute file number as a disk pointer in another database, but the datafiles referenced by the two disk pointers are completely different. Since it is common to have a very large number of disk pointers within a datafile, it is difficult to copy a datafile for use in another database. Within the transferred datafile, every disk pointer must be patched, replacing the absolute file numbers in the disk pointer with a newly assigned absolute file number in the destination database. This procedure may be impossible to do if a database cannot recognize or enumerate all the disk pointers in the datafiles. Even if the database can visit every disk pointer, it will be a very time consuming process.

Accordingly, there is a need for a way to increase the address space of disk pointers in an upward compatible manner. There is also a need for a way to transfer disk pointers between databases without patching.

SUMMARY OF THE INVENTION

In accordance with an aspect of the invention, a method of retrieving a data item from a computer database includes partitioning the database into a set of tablespaces and storing references to data items as tablespace-relative pointers, indicating a location relative to the tablespace containing the data item. A data item is retrieved from any one of the datafiles, by reading a tablespace-relative pointer, determining a tablespace identity from an operating context, and locating the data item based on the tablespace-relative pointer and the tablespace identity.

In accordance with another aspect of the invention, a database system comprises a set of datafiles and a set of tablespaces forming a partition of and containing the set of datafiles. Also contained in the set of datafiles is a set of data items. References to the data items are stored in the set of datafiles as tablespace-relative pointers, indicating the location of a corresponding data item relative to the tablespace containing the corresponding data item. In another embodiment, the database system is configured to locate a data item within the set of datafiles by reading a tablespace-relative pointer, determining a tablespace identity from an operating context, and locating the data item based on the tablespace-relative pointer and the tablespace identity.

In accordance with a further aspect of the invention, a computer readable medium has a sequence of instructions for logically partitioning a set of datafiles of a database into a set of tablespaces stored upon it. In another aspect, the computer readable medium has instructions for storing references to data items that are contained in the set of datafiles as tablespace-relative pointers. Each tablespace-relative pointer indicates a location of a corresponding data item relative to the tablespace containing the corresponding data item. In a further aspect, the computer readable medium has instructions for locating a data item within any one of the datafiles by reading a tablespace-relative pointer, determining a tablespace identity from an operating context, and locating a data item based on the tablespace-relative pointer and the tablespace identity.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 12(*a*), 12(*b*), and 12(*c*) are flowcharts illustrating the operation of unplugging a set of tablespaces from a database according to embodiments of the present invention.

DESCRIPTION OF THE PREFERRED EMBODIMENT

A method and apparatus for indicating the location of data items within a database is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
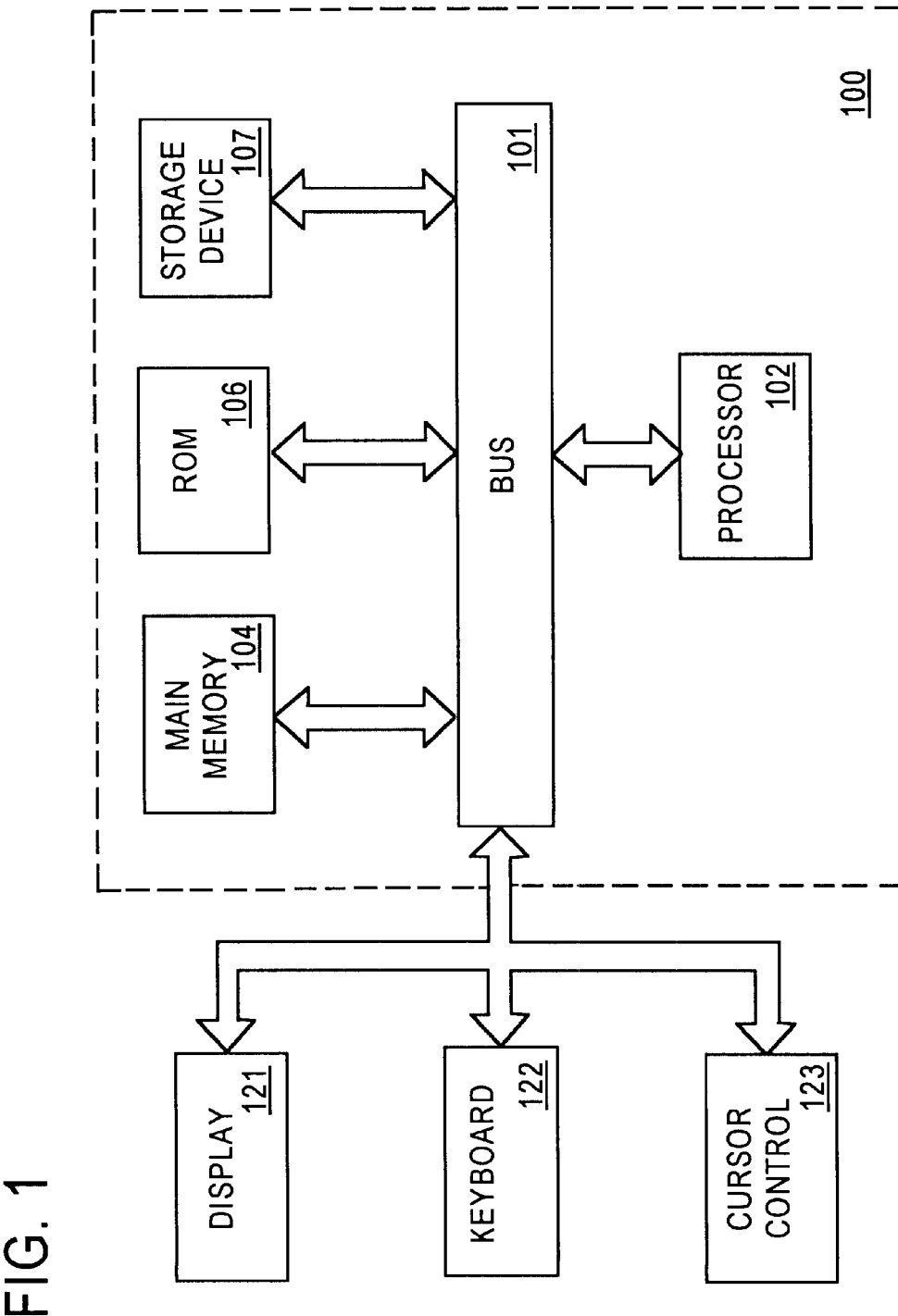
FIG. 1 is a block diagram of a computer system that may be used to implement the present invention.
Figure 2:
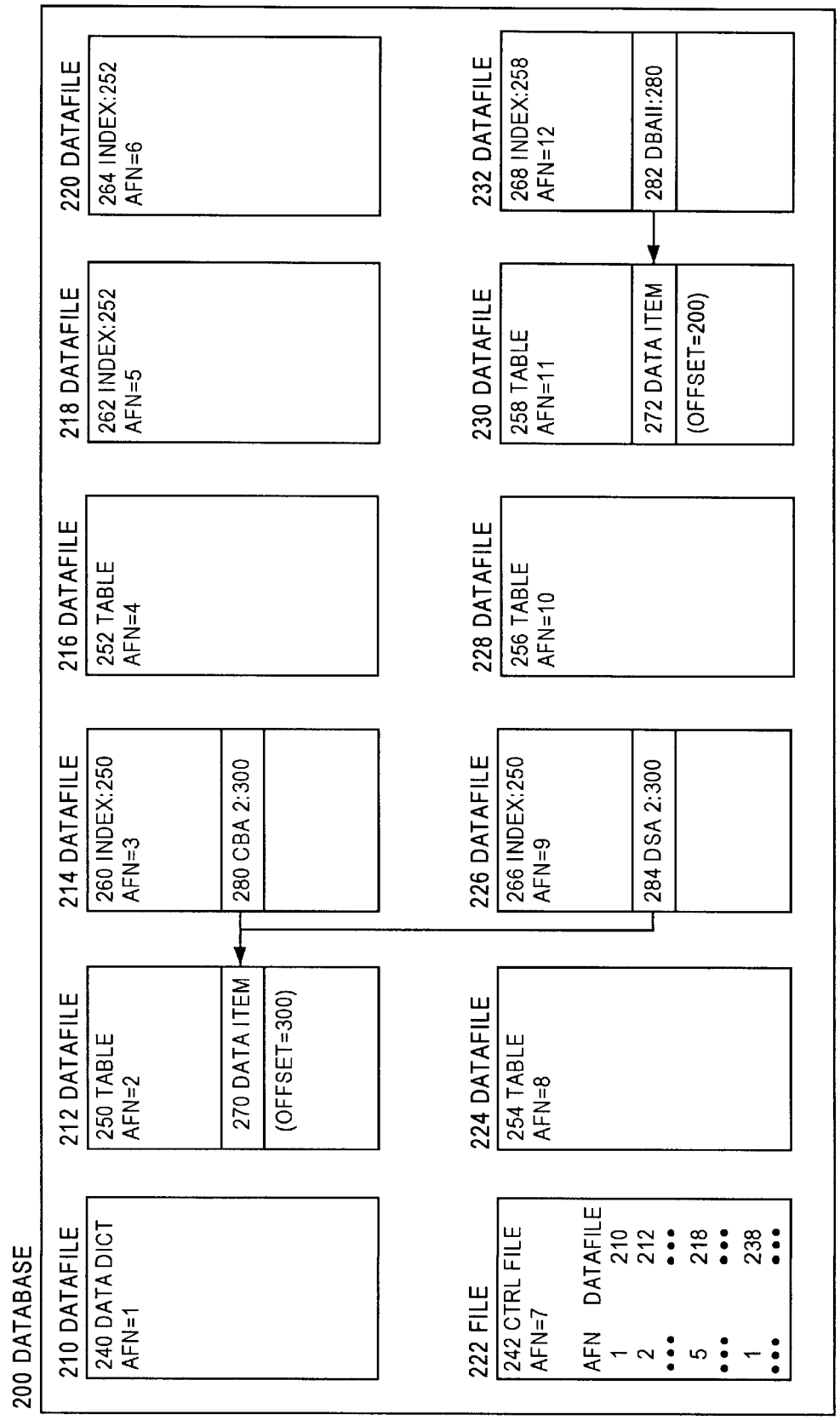
FIG. 2 is a depiction of a conventional database.
Figure 3:
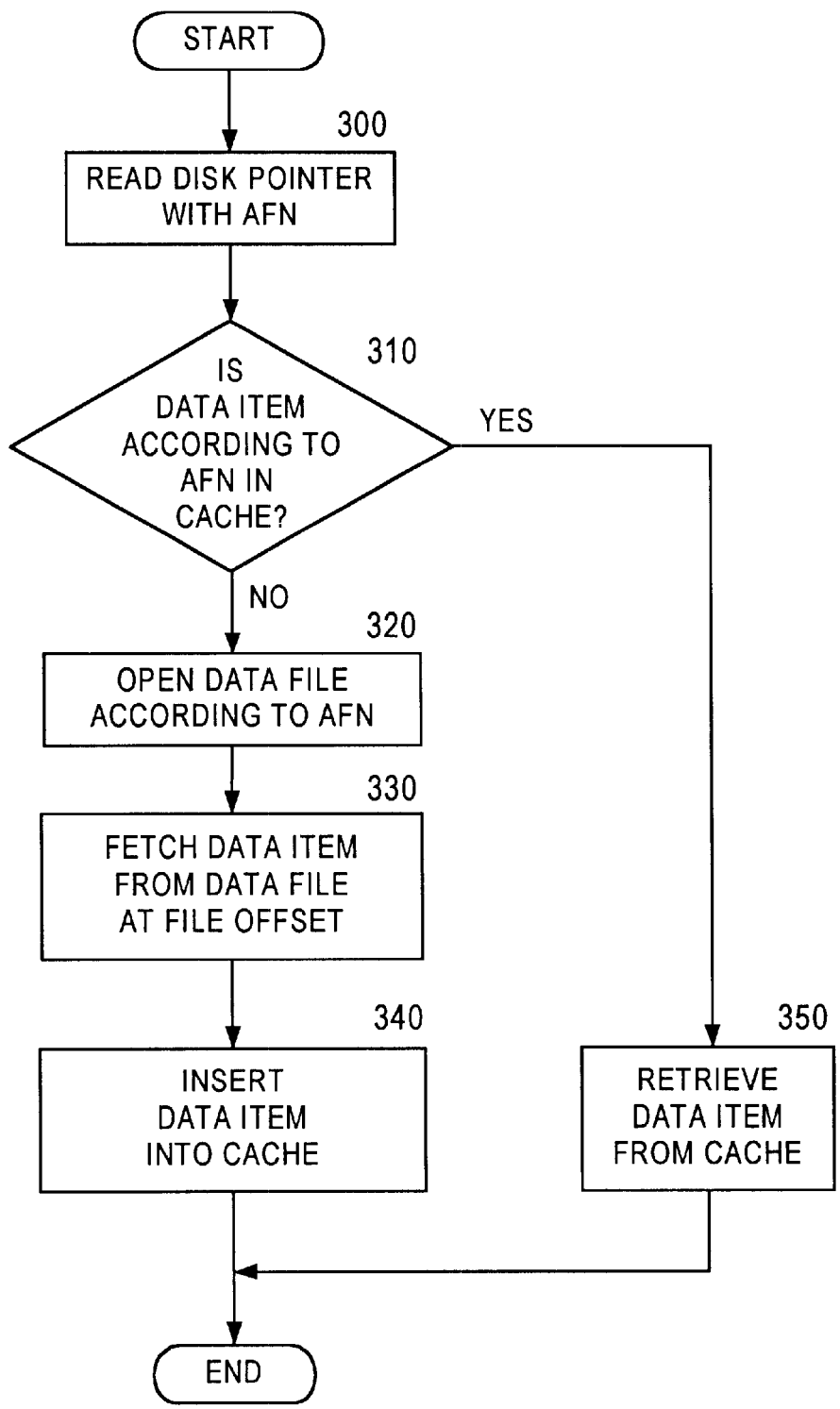
FIG. 3 is a flowchart illustrating the operation of fetching a data item with an absolute disk pointer.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to transfer data between databases. According to one embodiment, transferring data between databases is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

TABLESPACES

To increase the addressing range of disk pointers, groups of related datafiles are collected into tablespaces. A tablespace is a collection of one or more datafiles. Tablespaces function as a unit of object placement, space administration, and point-in-time recovery. Every datafile within a database belongs to exactly one tablespace, and whenever a new datafile is added to a database, it is always added to a specific tablespace. A table or an index may be undivided into smaller units, called partitions. Each partition is stored in the datafiles of a tablespace. Hence, a table or an index may belong to a plurality of tablespaces.

Figure 4:
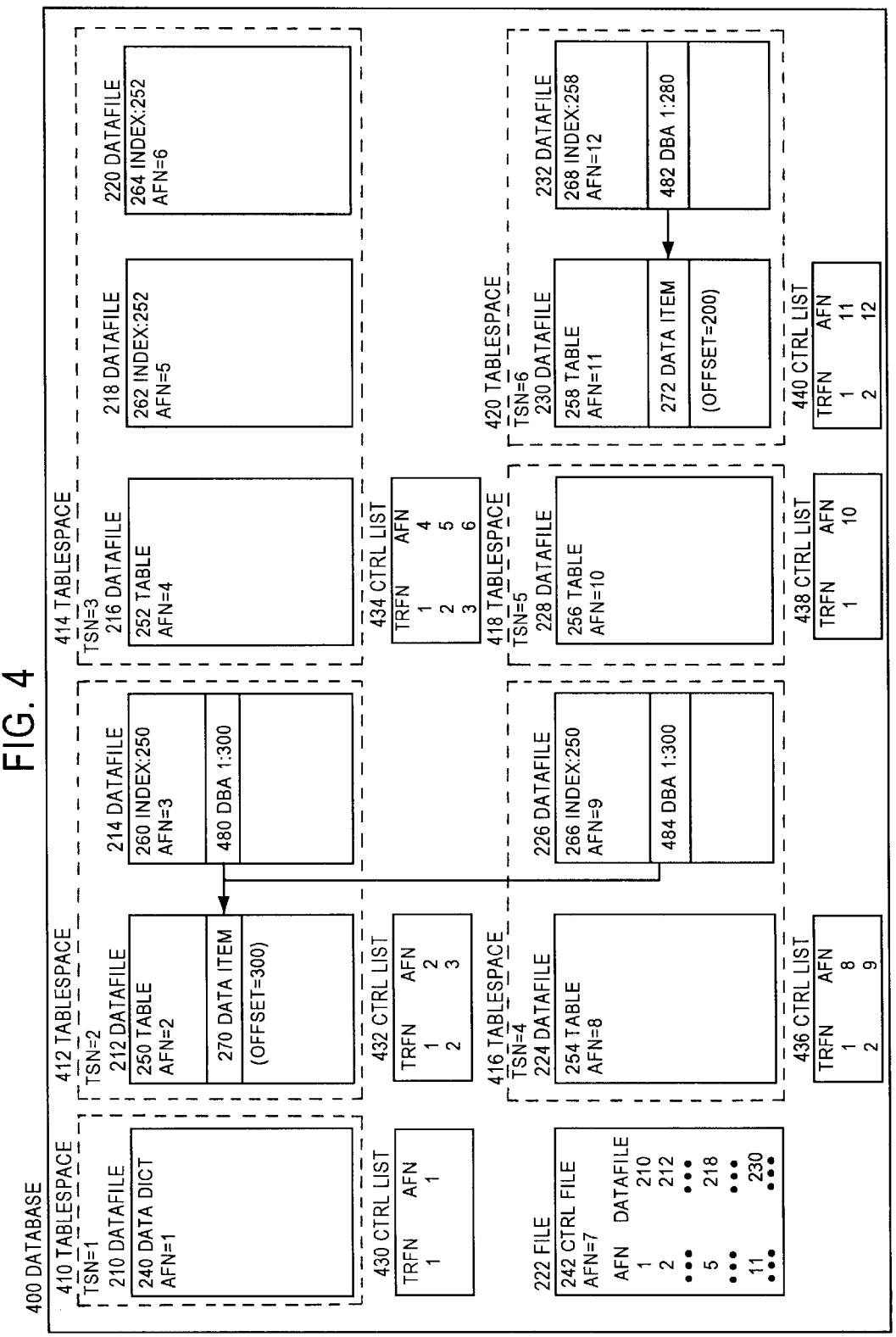
FIG. 4 is a depiction of a database according to an embodiment of the present invention.

For example, database 200 can be partitioned into six tablespaces as shown in database 400 in FIG. 4. Database 400 comprises six tablespaces, 410 to 420. Datafiles 212 and 214 belong to tablespace 412, and datafiles 216, 218, and 220 belong to tablespace 414. System tablespace 410 comprises data dictionary 240. Control file 242 is kept separate, not part of a tablespace.

When a tablespace is created within a database, it is assigned a tablespace number (TSN), which is unique for that database. The tablespace number is limited to a word size, on a 32-bit machine signifying a theoretical limit of about four billion. Each tablespace are associated with a control list of datafiles, containing a tablespace-relative file number (TRFN) and the corresponding datafile. Thus in FIG. 4, tablespaces 410 to 420 each associated with control lists 430 to 440. In particular, tablespace 412 is associated with control list 432, which has entries indicating that a datafile having TRFN of 1 corresponds to the datafile having an AFN of 2. Likewise, a datafile with a TRFN of 2 corresponds to the datafile with an AFN of 3. Control lists 430 to 440 are actually kept in control file 242 but are depicted in FIG. 4 near the corresponding tablespaces for clarity.

A TRFN is unique among the datafiles of a tablespace, but need not be unique among all the datafiles of a database. In fact, a datafile may have different TRFN in different control lists. In the example of FIG. 4, tablespace 412 has a TSN of 2 and control list 432. Datafile 212 of tablespace 412 has a TRFN of 1 according to control list 432, yet datafile 230 in tablespace 420 also has a TRFN of 1 according to control list 440. Thus, both datafile 212 and datafile 230 have the same TRFN, but they are distinct datafiles. However, the TSNs are different: tablespace 420 has a TSN of 6, and tablespace 412 has a TSN of 2.

Any datafile can be identified by a TRFN in conjunction with a TSN of the tablespace containing the datafile, using the following procedure. Given a TSN and a TRFN, the control list of the tablespace corresponding to the TSN is inspected. The control list entry with the TRFN is fetched, yielding the AFN for the datafile. With the AFN, the operating system information describing how to open the datafile is fetched from the control file, and datafile is opened, if necessary. In the example of FIG. 4, given a TSN of 4 and a TRFN of 1, control list 436 is inspected because it belongs to tablespace 416 having the TSN of 4. From control list 436 the entry for a TRFN of 1 is fetched, yielding an AFN of 8. Looking up the entry for an AFN of 8 in control file 242, datafile 224 is identified. Thus, a TSN:TRFN pair uniquely identifies a particular datafile.

Since a single AFN may be derived from a pair numbers consisting of a TSN and a TRFN, this pair of numbers can replace the AFN in data block address. A tablespace-relative DBA, therefore, is a data block address which uses a TSN, a TRFN, and a file offset to specify the location of a data block. The TSN and TRFN are used to find the proper AFN. The datafile identified by the AFN is opened, and the data block is fetched from the file offset. Looking up the proper AFN from a TSN:TRFN pair may be done by inspecting each control list individually, but in a preferred embodiment all the TSN:TRFN:AFN triples of the database are cached in an open hash table kept in main memory, allowing rapid look up. Any other data structure that can store triples, such as an array, linked list, or tree, may used as well.

The tablespace number for a disk pointer can be derived from the operating context in which the disk pointer is used. Specifically, every disk pointer is associated with a unique tablespace, because each disk pointer is associated with a specific purpose according to metadata in the data dictionary. For example, disk pointers found in an index are associated with the specific table in a specific tablespace upon which the index was built. In the example, disk pointer 480 is found in index 260 built on table 250. Table 250 resides in tablespace 412 with a TSN of 2. Therefore, disk pointer 480 is associated with tablespace 412 and a TSN of 2 can be derived for that disk pointer. Similarly, disk pointer 484 is found in index 266 also built on table 250. Accordingly, disk pointer 484 has a derivable TSN of 2.

When a disk pointer is read from a datafile, the database system can obtain a TSN for the disk pointer from the operating context. Therefore, the TSN of a tablespace-space DBA need not be stored in a disk pointer embedded in a datafile, allowing the portion of a disk pointer allocated for the AFN to indicate the TRFN instead. Such a disk pointer is a "tablespace-relative disk pointers." Disk pointers not embedded within a datafile, such as those disk pointers found in recovery logs, are stored with the proper TSN.

The tablespace-relative pointer addressing scheme allows a maximum of 1024 datafiles per tablespace, not database, and over four billion tablespaces per database. As a result, the allowable number of datafiles is no longer limited by the 10-bit absolute file number field in the disk pointer, but by the word size of host computer. In short, the theoretical maximum number of datafiles per database is increased to over four billion datafiles per database.

This approach is upwardly compatible with the pre-existing DBAs, so that upgrading databases using absolute file numbers in their disk pointers will not entail patching the disk pointers. Since the number of bits allocated the file number field of a disk pointer remains the same, and since the size of the disk pointer is unchanged, no disk pointer will have to be patched due to format changes. If the upgrade process ensures that the tablespace-relative file number is identical to the prior absolute file number, then the value of the file number field of a disk pointer remains valid, also avoiding the need to patch it. Therefore, the use of tablespace-relative file numbers is upwardly compatible.

Tablespace-relative disk pointers also facilitate the transfer of a group of datafiles within a tablespace without having to patch the disk pointers. Tablespace-relative file numbers need not be unique between tablespaces, only within a tablespace. Therefore, plugging a new tablespace into a database does not create any file number conflicts in the disk pointers, allowing the transfer to be made without having to patch the disk pointers.

Using tablespace-relative disk pointers requires an extra level of indirection to convert a tablespace-relative file number to an absolute file number. As a result, the preferred embodiment of the invention contemplates techniques to reduce the processing overhead of using tablespace-relative file numbers. Such techniques shall be described in greater detail hereafter.

CACHING DATA ITEMS

Figure 5:
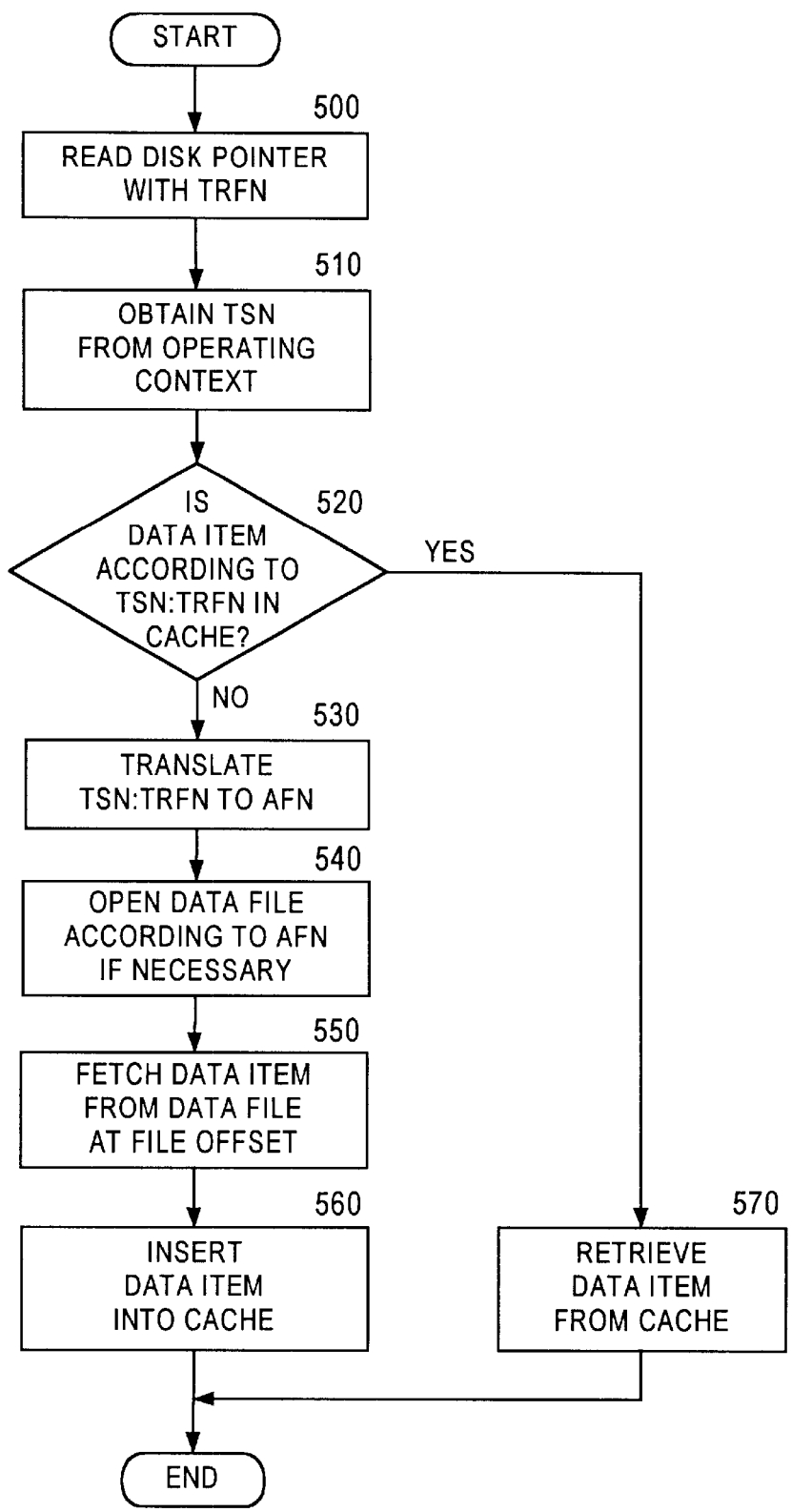
FIG. 5 is a flowchart illustrating the operation of fetching a data item according to an embodiment of the present invention.

One technique for reducing the overhead associated with using tablespace-relative file numbers involves caching data items so that they may be retrieved according to their tablespace-relative file numbers. With reference to FIG. 5, a disk pointer is read in step 500 containing a tablespace-relative file number (TRFN) and a file offset. Next in step 510, the tablespace number (TSN) is obtained from the operating context of the data item retrieval. For example, the TSN for a disk pointer located in a table and used to chain data items within the table is the number of the tablespace in which the table resides. On the other hand, the TSN for a disk pointer located in an index is the number of the tablespace for the table upon which the index was built. In FIG. 4, the TSN for disk pointer 484 is 2, because index 266 is built upon table 250, residing in tablespace 412.

In step 520, the cache is checked for the data item specified by the TSN and TRFN. On a cache miss, the TSN:TRFN pair is translated into an absolute file number (AFN) in step 530. After the AFN is determined, the information in the control file corresponding to the AFN is used to open the datafile (step 540). Then, the data item at the file offset is fetched from the opened datafile (step 550). Finally, the data item is inserted into the cache (step 560). Upon a cache hit, the execution proceeds to step 570 where the data item is simply retrieved from the Therefore, the TSN:TRFN pair is translated only upon a cache miss, reducing the number of translations. On a cache hit, however, using tablespace-relative file number is just as efficient at using absolute file numbers.

CONCURRENCY CONTROL

Translating the TSN:TRFN pair into the proper AFN, however, brings up the issue of concurrency. In a concurrent database, more than one user at a time may simultaneously update the database, possibly adding or removing datafiles from a tablespace. Generally, data structures are protected in a concurrent environment by obtaining a latch for a critical section of processing. A latch in this context is a mutually exclusive lock and may be implemented in a variety of ways known in the art, including but not limited to semaphores.

Once a latch is obtained, the data structure protected by the latch may be safely read or written without unexpected changes to the data structure. Other processes wishing to use the data structure must wait until the latch is released. Latches within a fault-tolerant database, however, can be expensive because the database must be able to recover from a crashed process, even when the process crashes while holding the latch. In this case, the database system must clean up and free the latch, to allow the latch to be obtained by other surviving processes. Providing such fault tolerance increases the code path for obtaining and releasing latches. Given the performance penalties in using a latch, a preferred embodiment seeks to reduce the reliance upon obtaining the latch.

Figure 6:
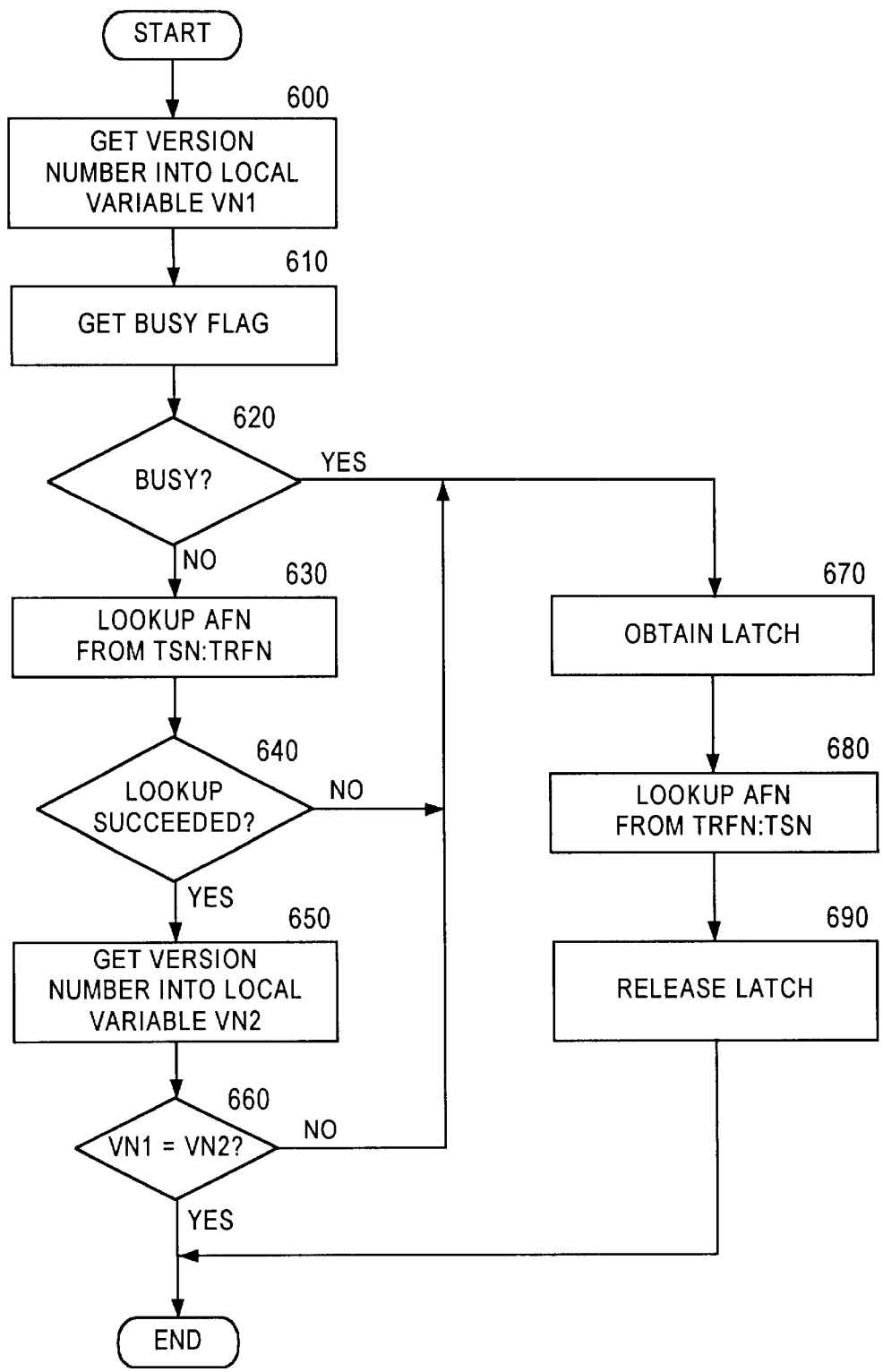
FIG. 6 is a flowchart illustrating the operation of translating a tablespace-relative disk pointer with a cache according to an embodiment of the present invention.

A latch-free translation of a TSN:TRFN pair to an AFN is shown in FIG. 6. A map, which is a data structure containing a set of translations, is protected by a latch. Updates to the map are serialized by this latch, but lookups do not need to obtain the latch if the map is not being simultaneously updated. In fact, the map is rarely being simultaneously updated because databases rarely need to change their file number translations.

Figure 7:
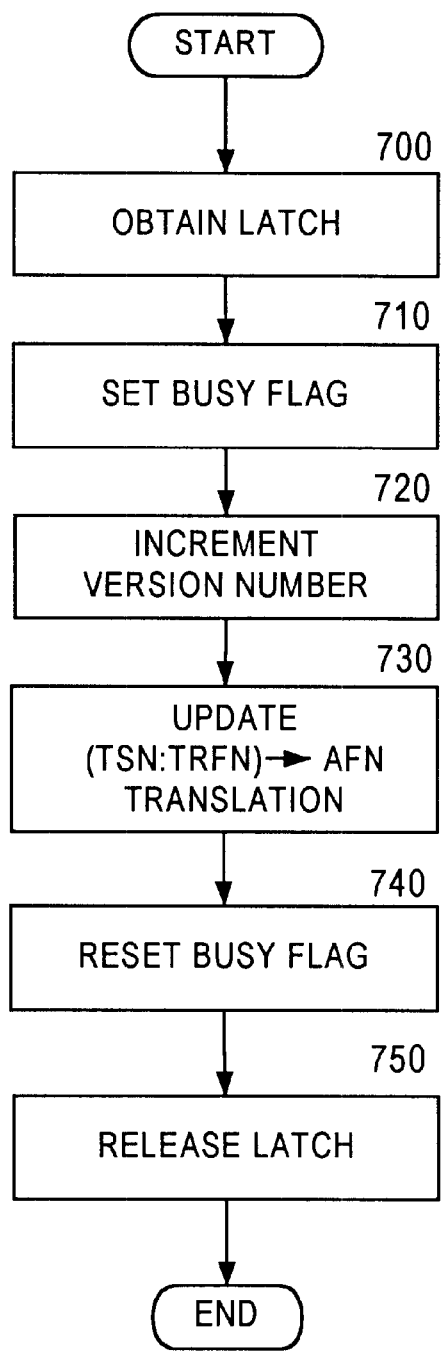
FIG. 7 is a flowchart illustrating the operation of inserting a translation into the cache.

The operation of updating the translation map starts at step 700 in FIG. 7. To reduce the dependence on obtaining and release the latch for concurrency control, the update operation manipulates two shared variables: a busy flag and a version number. After obtaining the latch in step 700, the process sets the busy flag (step 710) and increments the version number (step 720). At this point, the translation map is updated (step 730). When the process is finished with the map, the process resets the busy flag (step 740) and releases the latch (step 750).

The operation of looking up a translation from the map starts at step 600 in FIG. 6. At step 600, the lookup process saves the shared version number into a local variable (VN1). At step 610, the process reads the busy flag and checks the state of the busy flag (step 620). If the busy flag is not set, meaning that the map is likely not being concurrently updated, execution proceeds to step 630, where the AFN is looked up from the TSN:TRFN pair. At this point, the lookup process should beware of reading data without a latch. When following pointers (if, for example, the map is implemented as a hash table), the lookup procedure should perform range and possibly alignment checking, to avoid segmentation faults. Accordingly, the lookup process determine whether the translation is successful (step 640).

If the translation is successful, the lookup process proceeds to step 650 for rereading the shared version number. At step 660, if the new version number (VN2) differs from the initial version number (VN1), then an update process had concurrently modified the map. If the two version numbers do not differ, then the map was not modified during the lookup, so the latch-free lookup operation is complete.

The lookup operation always retries with a latch, starting at step 670, when it detects that another process may be updating the map simultaneously. This happens when the busy flag is set (step 620), when the two version numbers differ (step 660), or when there are any inconsistencies in the data structure for the map (step 640). To lookup with the latch, the process simply obtains the latch (step 670), looks up the translation in the map (step 680), and released the latch (step 690).

The map may be implemented by any data structure that allows a one-to-one mapping to be stored, such as an array indexed by absolute file number, a hash tables of mappings, a linked list of mappings, and so forth. In the preferred embodiment, an open hash table, implemented by techniques well-known in the art, is used.

PLUGGABLE TABLESPACES

To facilitate the transfer of a group of datafiles from one database to another, groups of related datafiles are collected into tablespaces. A tablespace is a collection of one or more datafiles. Tablespaces function as a unit of object placement, space administration, and point-in-time recovery. Every datafile within a database belongs to exactly one tablespace, and whenever a new datafile is added to a database, it is always added to a specific tablespace.

Figure 8B:
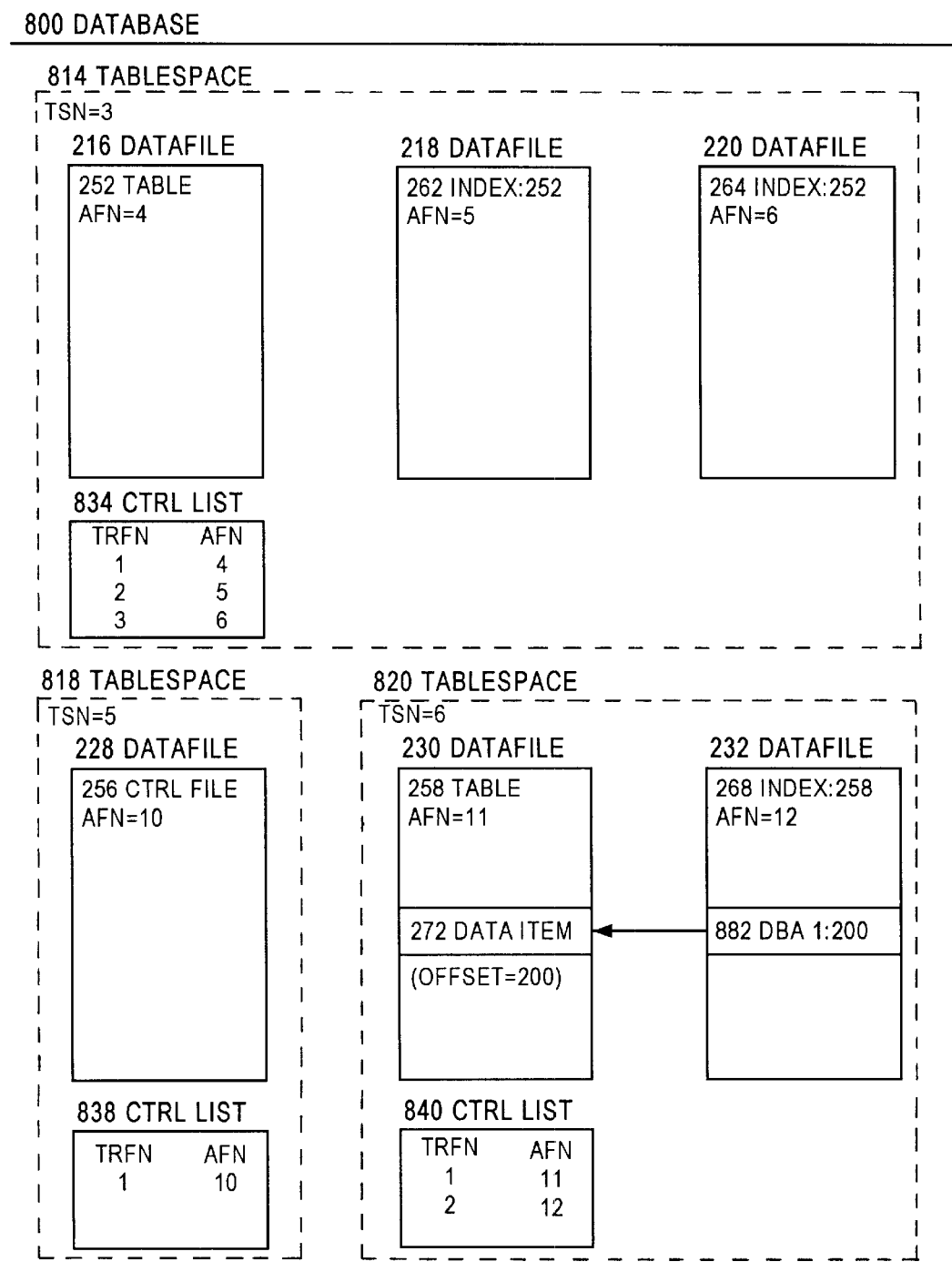
FIGS. 8, 8(*a*), and 8(*b*) are depictions of a source database according to an embodiment of the present invention.

For example, database 200 can be partitioned into six tablespaces as shown in database 500 in FIG. 8. Database 500 comprises six tablespaces, 810 to 820. Datafiles 212 and 214 belong to tablespace 812, and datafiles 216, 218, and 220 belong to tablespace 814. System tablespace 810 comprises data dictionary 240 and control file 242.

According to an embodiment of the invention, transferring data between two databases has two phases. In the first phase, a user "unplugs" a set of tablespaces, containing the desired data, from a source database. Unplugging a set of tablespaces is started by issuing an "unplug" command to a database system, which performs in response the steps shown in FIG. 12(*a*). At step 1200, the database system gets a specification of the tablespaces to be transferred, called the "pluggable set." Step 1210 receives the name of an export/import file from the user. For example, a user desiring to transfer the data in table 250 and index 260 from database 800 specifies tables 812 in the unplugging operation. With the pluggable set and the name of the export/import file, the source database produces a set of files (steps 1204 and 1206) that the user may then copy to a place accessible to the target database.

According to one embodiment of the invention, the unplug operation in step 1206 removes the set of tablespaces from the source database; however, another embodiment of the invention leaves the set of tablespaces unchanged in the source database. A preferred embodiment of the invention enables both operations. In this situation, the former operation is termed "unplugging" a set of tablespaces, and the latter operation, "copying" a set of tablespaces.

Given a set of unplugged or copied tablespaces, the user may then plug the set of tablespaces into a target database by issuing a plug-in command with the name of export/import file. The metadata is reconstructed from the pluggable set and the plugged-in tablespaces become new tablespaces in the target database.

According to one embodiment of the invention, the target database performs the steps illustrated in FIG. 13(*a*). If the pluggable set is located at another site, the target computer system creates a local copy of the file (step 1300), perhaps in a temporary working directory. For example, the target computer system may receive a network transfer of a pluggable set or download the pluggable set from a World Wide Web site.

After the pluggable set is made available to the target system, the name of the export/import file is obtained from a user (step 1302) and the exported metadata in the export/import file is imported and reconstructed (step 1304). At step 1306, the individual tablespaces in the pluggable set are copied so that the tablespaces may used without patching disk pointers (step 1308).

According to another embodiment, the target database accesses the set of tablespaces without copying the tablespaces. In step 1310, the target system received the pluggable on a computer-readable medium in a drive. After prompting for the name of the export/import file (step 1312) and importing the metadata (step 1314), the target system accesses the tablespaces in the pluggable set directly (step 1316), without patching the disk pointers (step 1318).

In a preferred embodiment, both approaches are permitted according to the presence or absence of a "read-only" option. If the read-only option is not specified, then the tablespaces are copied in; on the other hand, if the read-only option is specified, then the tablespaces are used in the drive directly. The read-only option is useful with plugging in tablespaces published on a CD-ROM, because the target database will use the tablespaces by reading the CD-ROM drive without copying the tablespaces into the target database.

The two difficulties in the prior art due to the internal structure of databases are handled by using tablespace-relative disk pointers to avoid disk pointer patching and by exporting/importing only the metadata associated with the transferred set of tablespaces.

TABLESPACE-RELATIVE DISK POINTERS

When a tablespace is created within a database, it is assigned a tablespace number (TSN), which is unique for that database. Each tablespace contains a control list of datafiles, containing a tablespace-relative file number (TRFN) and the corresponding datafile. Thus in FIG. 8, tablespaces 810 to 820 each include control lists 830 to 840. In particular, tablespace 812 includes control list 832, which has entries indicating that a datafile having TRFN of I corresponds to the datafile having an AFN of 2. Likewise, a datafile with a TRFN of 2 corresponds to the datafile with an AFN of 3.

A TRFN is unique among the datafiles of a given tablespace, but need not be unique among all the datafiles of a database. In the example of FIG. 8, tablespace 812 has a TSN of 2 and control list 832. Datafile 212 of tablespace 812 has a TRFN of 1 according to control list 832, yet datafile 230 in tablespace 520 also has a TRFN of 1 according to control list 840. Thus, both datafile 812 and datafile 230 have the same TRFN, but they are distinct datafiles. However, the TSNs are different: tablespace 820 has a TSN of 6, and tablespace 812 has a TSN of 2.

Any datafile can be identified by a TRFN in conjunction with a TSN of the tablespace containing a control list with an entry for that TRFN, using the following procedure. Given a TSN and a TRFN, the control list of the tablespace corresponding to the TSN is inspected. The control list entry with the TRFN is fetched, yielding the AFN for the datafile. With the AFN, the operating system information describing how to open the datafile is fetched from the control file, and datafile is opened, if necessary. In the example of FIG. 8, given a TSN of 4 and a TRFN of 1, control list 836 is inspected because it belongs to tablespace 816 having the TSN of 4. From control list 836 the entry for a TRFN of 1 is fetched, yielding an AFN of 8. Looking up the entry for an AFN of 8 in control file 242, datafile 224 is identified. Thus, a TSN:TRFN pair uniquely identifies a particular datafile.

Since a single AFN may be derived from a pair numbers consisting of a TSN and a TRFN, this pair of numbers can replace the AFN in data block address. A tablespace-relative DBA, therefore, is a data block address which uses a TSN, a TRFN, and a file offset to specify the location of a data block. The TSN and TRFN are used to find the proper AFN. The datafile identified by the AFN is opened, and the data block is fetched from the file offset. Looking up the proper AFN from a TSN:TRFN pair may be done by inspecting each control list individually, but in a preferred embodiment all the TSN:TRFN:AFN triples of the database are cached in an open hash table kept in main memory, allowing rapid look up. Any other data structure that can store triples, such as an array, linked list, or tree, may used as well.

The tablespace number for a disk pointer can be derived from the operating context in which the disk pointer is used. Specifically, every disk pointer is associated with a unique tablespace, because each disk pointer is associated with a specific purpose according to metadata in the data dictionary. For example, disk pointers found in an index are associated with the specific table in a specific tablespace upon which the index was built. In the example, disk pointer 880 is found in index 260 built on table 250. Table 250 resides in tablespace 812 with a TSN of 2. Therefore, disk pointer 880 is associated with tablespace 812 and a TSN of 2 can be derived for that disk pointer. Similarly, disk pointer 884 is found in index 266 also built on table 250. Accordingly, disk pointer 884 has a derivable TSN of 2.

When a disk pointer is read from a datafile, the database system can obtain a TSN for the disk from the operating context. Therefore, the TSN of a tablespace-space DBA need not be stored in a disk pointer embedded in a datafile, allowing the portion of a disk pointer allocated for the AFN to indicate the TRFN instead. Such a disk pointer is a "tablespace-relative disk pointers." Disk pointers not embedded within a datafile, such as those disk pointers found in recovery logs, are stored with the proper TSN. However, recovery logs are not transferred from database to database and do not therefore pertain transferring data between databases.

Figure 11:
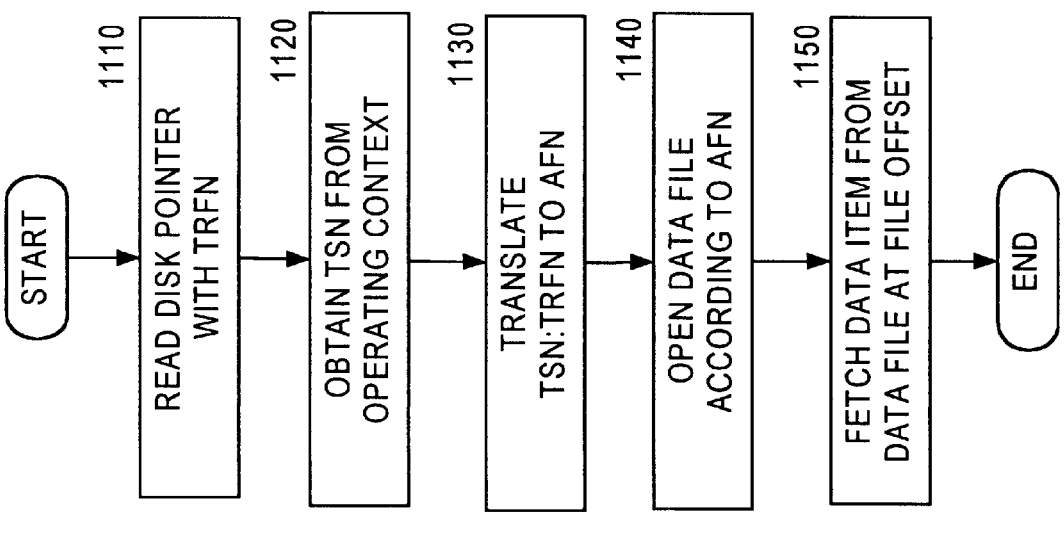
FIG. 11 is a flowchart illustrating how a data item pointed to by a tablespace-relative pointer is fetched.

When disk pointers are stored in a datafile in tablespace-relative format, the method for accessing the data block pointed by a tablespace-relative disk pointer is shown in FIG. 11. In step 1110, the disk pointer containing a TRFN and a file offset is read from a datafile. In the next step 1120, a TSN is obtained from an operating context. For a disk pointer read from an index, the TSN is the TSN of the tablespace in which the base table for the index is contained. For example the TSN for disk pointer 280, obtained from the operating context, is 1, because index 260 was built on table 250 in tablespace 812 having a TSN of 1.

Proceeding to step 1130, the TSN:TRFN pair is translated into an AFN. In the example, the TRFN of 1 is looked up in control list 832 of tablespace 812 with a TSN of 1, and an APN of 2 is fetched. In a preferred embodiment, an open hash table containing the entries of all the control lists in database 800 is consulted for the AFN. Next, in step 1140, the AFN is used to open the corresponding datafile according to the operating system specific information stored for the entry belonging to the AFN. In the example, an AFN of 2 specifies datafile 212. Once the datafile is opened, the data item is fetched from (step 1150).

Figure 9:
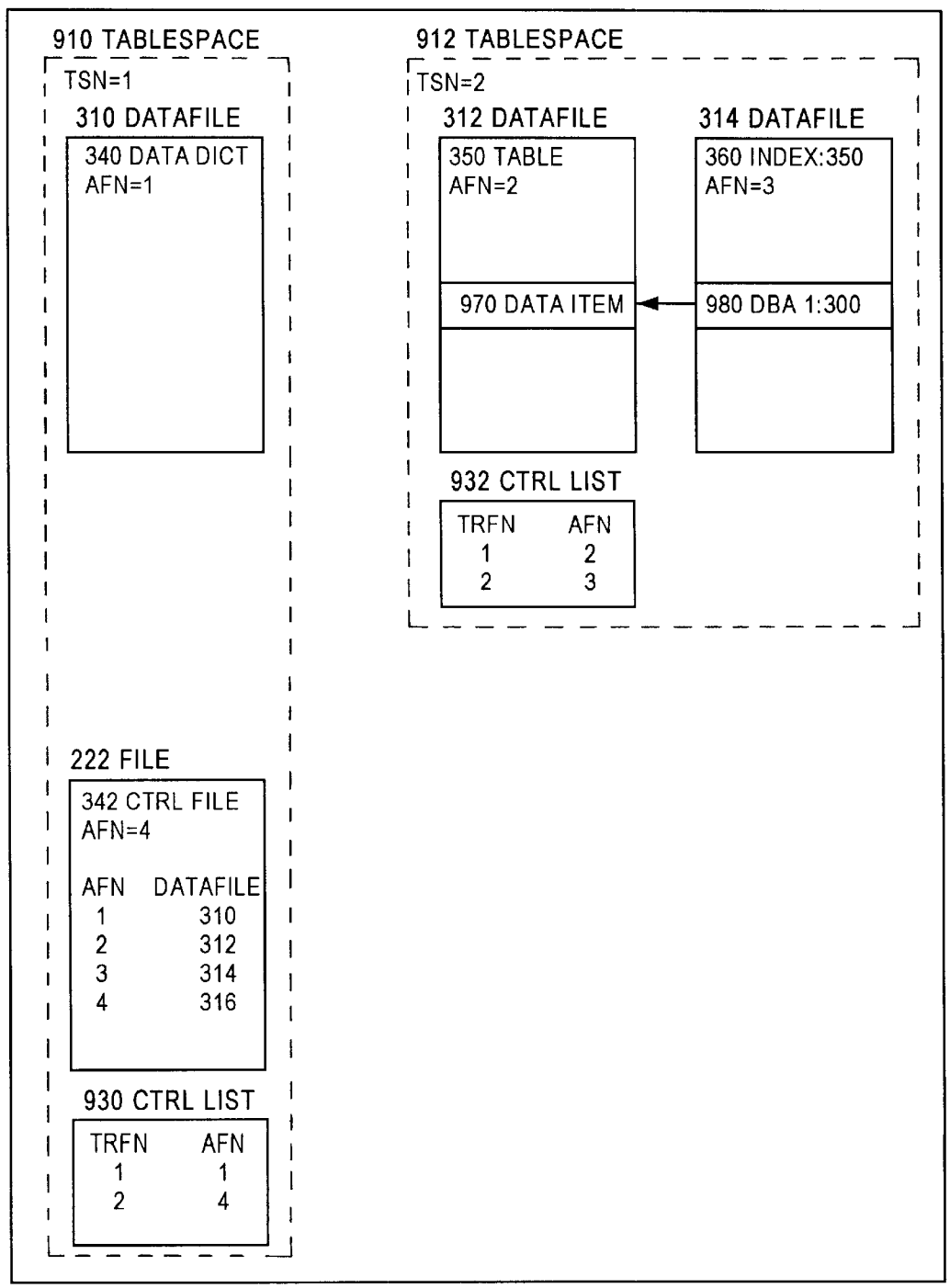
FIG. 9 is a depiction of a destination database according to an embodiment of the present invention.

Tablespace-relative disk pointers allow datafile disk pointers to be copied without having to be patched. FIG. 9 shows a destination database 900 with two tablespaces, 910 and 912. Tablespace 912 comprises two datafiles, 312 and 314, and control list 932. Datafile 314 is an index, index 360, built on table 350, and contains tablespace-relative disk pointer 980 with a tablespace-relative DBA of 1:300, pointing to data item 970 in table 350. Copying tablespace 812 of database 800 yields database 1000 in FIG. 10(*a*). Disk pointer 880 maintains the same value, 1:300, but still points to data item 270, even in database 1000. During the plugging in process tablespace 812 is copied or accessed without patching any of its disk pointers in datafile 212 or 214. The administrative information in the control list 832 indicating the mapping between the TRFNs for tablespace 812 is reconstituted as described below. Non-dangling disk pointer 880 has the identical value in database 1000 as in database 800. However, tablespace- relative disk pointer 880 still points to data item 270, because the TSN for disk pointer 980 is 1, and control list 832 maintains that a TRFN of 1 indicates datafile 212. Thus, tablespace-relative disk pointers avoid the aliasing problem associated with the absolute disk pointer technology.

Figure 10A:
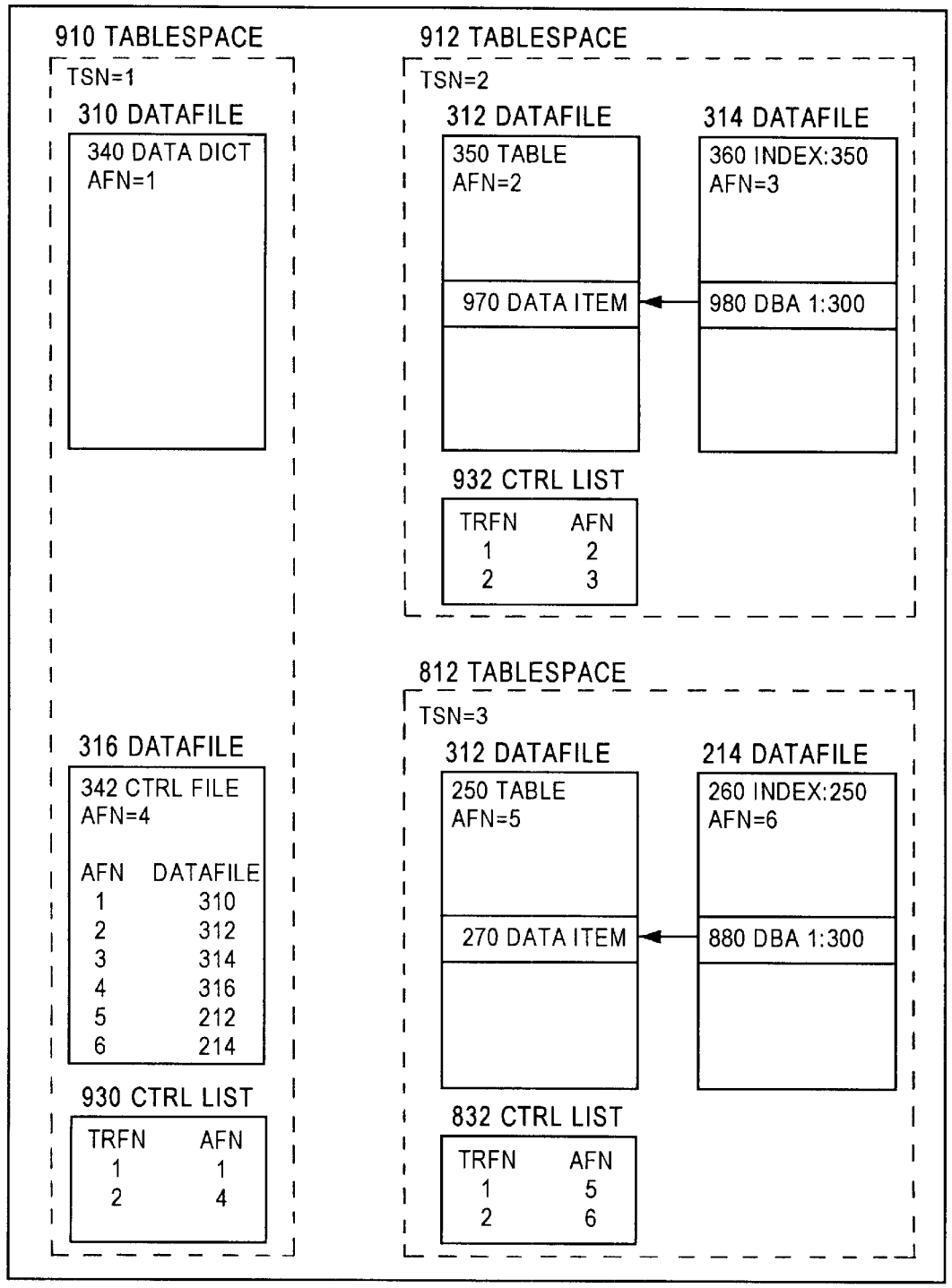
FIGS. 10(*a*), 10(*b*) and 10(*c*) are depictions of plugging in a tablespace according to an embodiment of the invention.
Figure 10B:
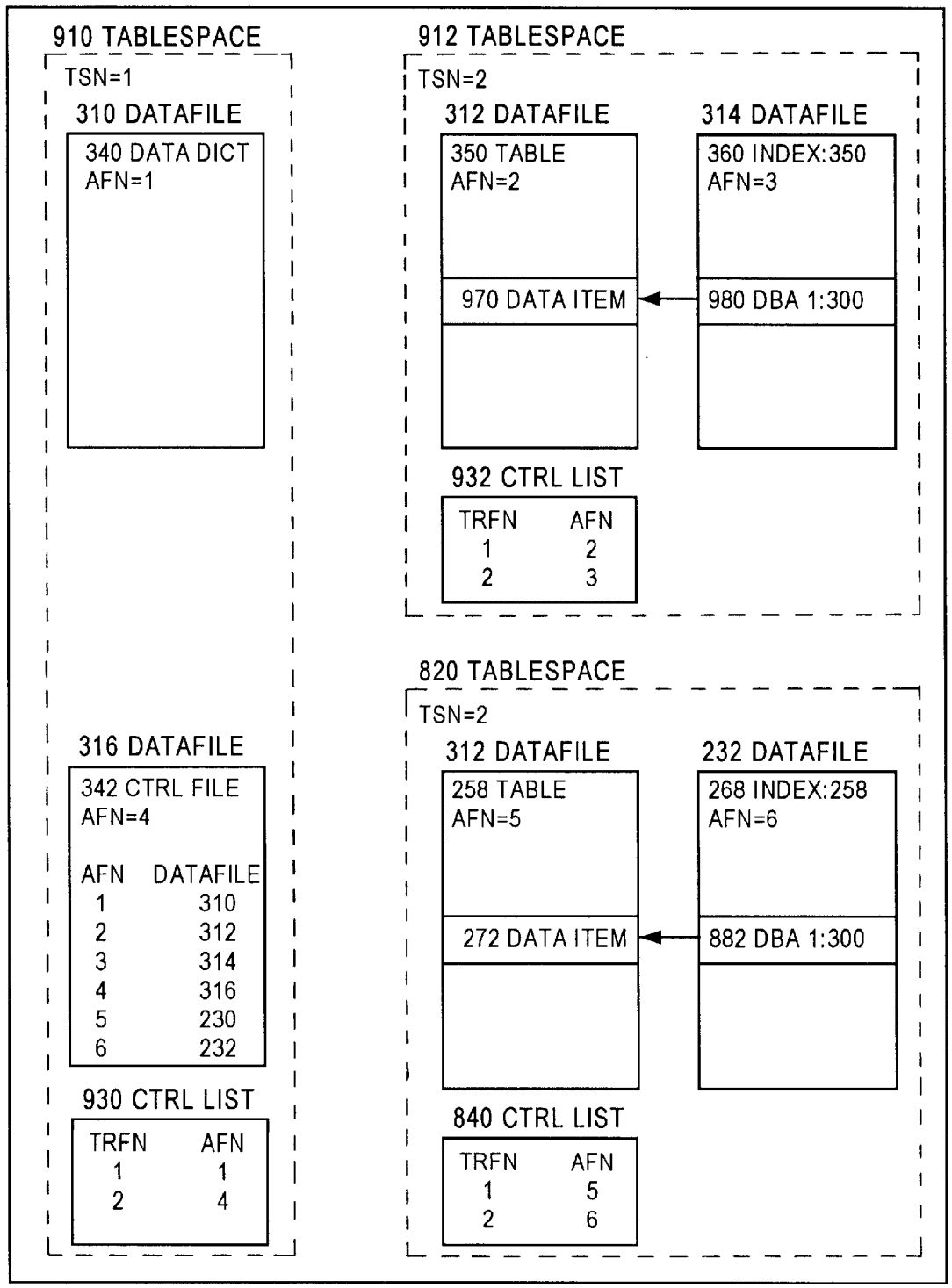

Tablespace-relative disk pointers also remain valid after being transferred to a target database. FIG. 10(*b*) illustrates the result, database 1002, of plugging tablespace 820 of database 800 into database 900. Tablespace-relative disk pointer 882 contains the same value of source database 800, 1:300. However, disk pointer 882 continues to point to data item 272, because the tablespace relative file number portion of the disk pointer is still valid.

Therefore, patching tablespace-relative disk pointers is avoided because only the corresponding control list is modified. All disk pointers are stored in tablespace-relative format, so that no disk pointer will have to be patched in either the unplugging or plugging in process.

INTEGRATING METADATA

Metadata concerning a set of tablespaces contains information about the objects in the tablespace. These objects include, for example, tables, clusters, indexes, partitioned tables, and referential integrity constraints. Metadata also includes information about space allocation in those tablespaces.

Some objects are related to associated with other objects. For example, indexes are typically associated with tables. An index that is built on a table contains database pointers to that table. As another example, referential integrity constraints can associate with several tables. In addition, all partitions of a table are related to each other. The database system typically keeps track of these relationships in a data dictionary. Therefore, the database system is able to determine whether a set of tablespaces, the "pluggable set," contains pointers outside the pluggable set.

According to an embodiment of the invention, dangling pointers are avoided by ensuring that the pluggable set is self-contained when the pluggable set is created. With reference to FIG. 12(*b*), during the metadata export process, the pluggable set is checked whether it is self- contained (step 1210). If the pluggable set is not self-contained, then all objects that may contain pointers to objects outside the pluggable set are dropped from the tablespace (step 1212).

After the pluggable set was made self-consistent, then metadata for the remaining objects in the pluggable set is exported (step 1214).

Figure 10C:
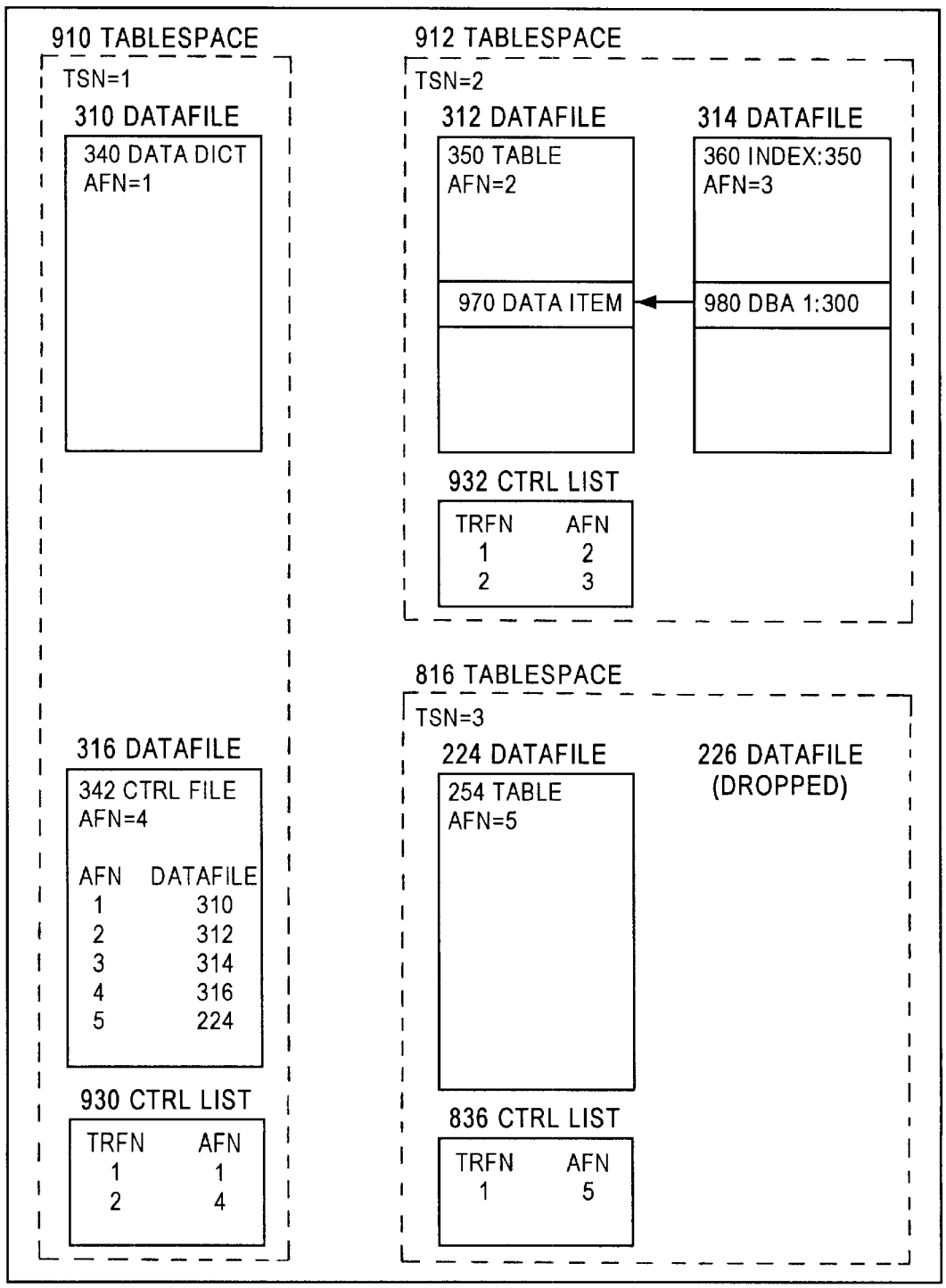

For example, when tablespace 816 as the only tablespace in a pluggable set is unplugged from database 800 of FIG. 8, the database system inspects the objects in the tablespace, table 254 and index 266. Index 266 is built on table 250, which is found in tablespace 812, which is not in the pluggable set. Therefore, the database will drop index 266 from unplugged tablespace 816. Accordingly, when the pluggable set is plugged into database 900 the result is shown in FIG. 10(c), where only table 254 is transferred to database 1004.

On the other hand, when a pluggable set is copied instead of unplugged, the database system prompts the user when the pluggable set is not self-contained. Referring to FIG. 12(c), the database system determines whether the pluggable set is self-contained (step 1220). If the pluggable set is not self-contained, then the database system signals errors to the user if there are objects that may contain dangling pointers (step 1222). This step allow the user to either drop those objects or change the pluggable set in order to make the pluggable set self-contained. Once the pluggable set is determined to be self-contained, then metadata is exported (step 1224).

In the example, if tablespace 816 is being copies, the database system determines that index 266 may contain pointers outside the pluggable set, because it is built on a table outside of the pluggable set. When the user is prompted, the user may allow index 266 to be dropped from the pluggable set or expand the pluggable set to include tablespace 812, which contains the table, table 250, upon which index 266 was built. In either case, the result is a self-contained pluggable set.

When the pluggable set is created in plug-in format, all the metadata information in the data dictionary about all objects in the pluggable set is exported in DDL format into an export/import file. This information includes data about tables, indexes, referential integrity constraints, and space allocation. For an object in the pluggable set, such as a table, part of the exported information includes a tablespace-relative pointer to the location of the object. The actual values of tablespace-relative pointers remain valid, but new tablespace numbers are assigned for the tablespaces in the pluggable set. The active control list information about tablespace numbering is kept in the data dictionary.

Figure 13C:
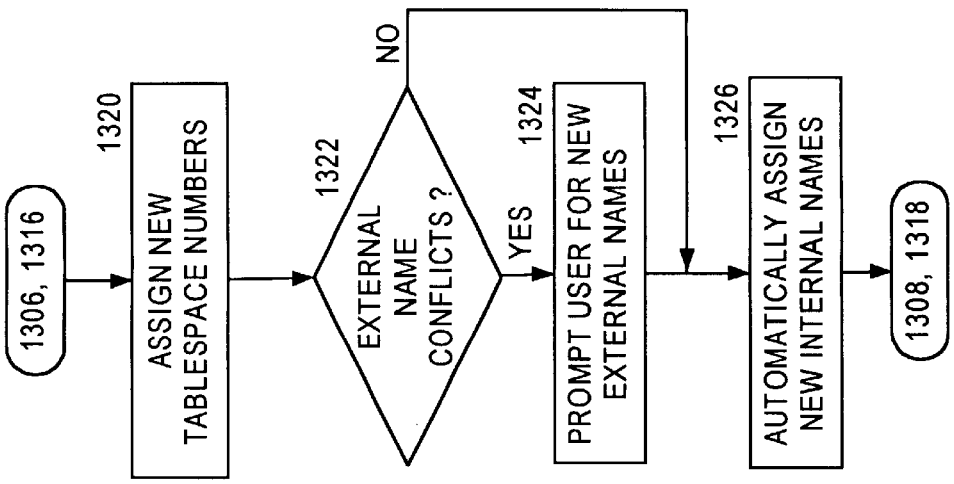
FIGS. 13(*a*), 13(*b*), and 13(*c*) are flowcharts illustrating the operation of plugging a set of tablespaces into a database according to embodiments of the present invention.
Figure 13B:
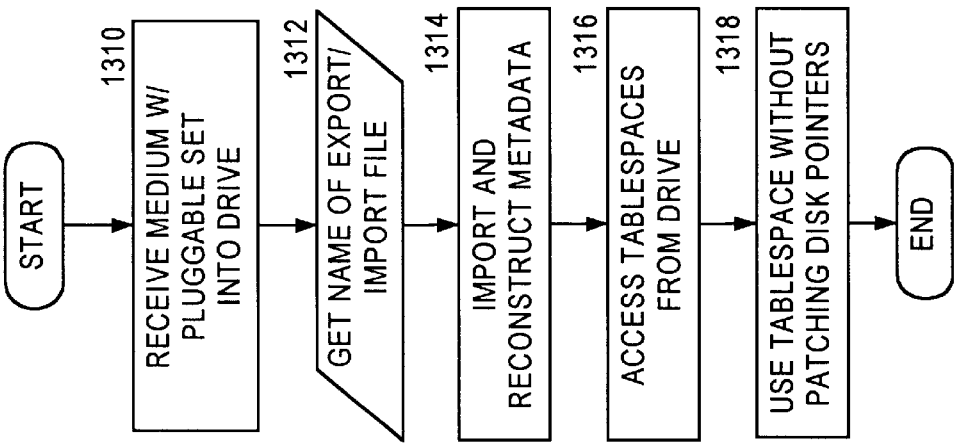
Figure 13A:
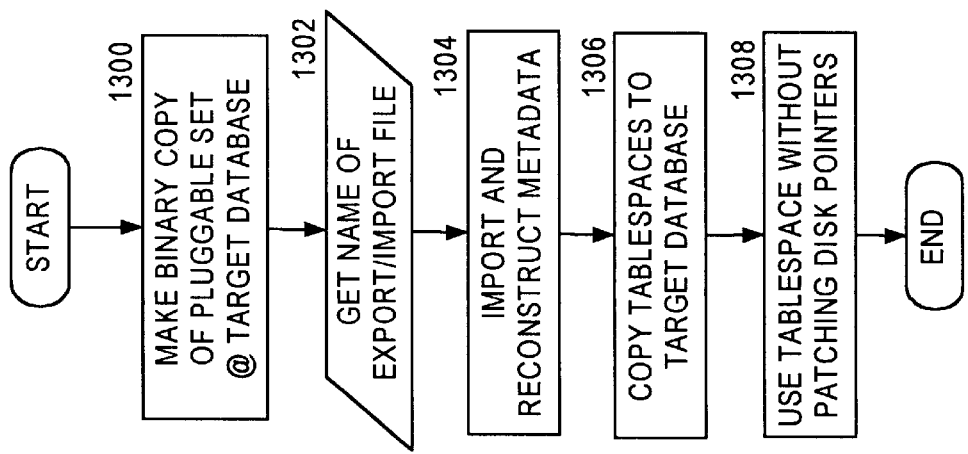

To plug the pluggable set in a target database, the export/import file is made accessible to the target database, for example, by copying the file to the target database system; see step 1300 of FIG. 13(a). In another embodiment, the export/import file is made accessible by loading a CD-ROM with the pluggable set into a CD-ROM drive accessible to the computer system running the target database; see step 1310 of FIG. 13(b).

The metadata for the pluggable set is reconstructed using the DLL statements in the export/import file and inserted into the target database's data dictionary (steps 1304 and 1314), the steps of which are illustrated in FIG. 13(c). In step 1320, the tablespaces in the pluggable set are assigned new tablespace numbers.

One issue with importing metadata is name conflicts. There are two kinds of name conflicts, external and internal. An external name is the name, usually in the form of a string, by which a user refers to a particular object. For example, a table may have an external name of "sales," and an external name conflict occurs when both the pluggable set and the target database contain a table called "sales." An internal name is typically used by a database system to keep track of the identity of objects. Some databases call the internal name of an object an object number. When a pluggable set is plugged in, some of the external and internal name may already be in use in the target database.

External name conflicts are resolved with help from the user. When metadata is being reconstructed for a pluggable set, the external name of an object, present in the metadata, is checked to determine whether the name is already being used in the database (step 1322). If that name is in use, then the plug-in procedure signals an error, giving the user a chance to change the offending name in the target database and re-execute the plug-in procedure (step 1324).

A special case occurs when a data warehouse is periodically refreshed with tablespaces from an OLTP database. In this case, the user should drop the tablespaces in the data warehouse before plugging a more recent version of the pluggable set from the OLTP database into the data warehouse. This procedure avoids a potentially large number of external name conflicts.

Internal name conflicts are resolved automatically during the plug-in process (step 1326). While the metadata is being imported into a target database, new objects are simply assigned a new internal name and propagated to other objects in the pluggable set that refer to them.

CD-ROM PUBLISHING

A particular aspect of pluggable tablespaces allows for CD-ROM publishing. A set of tablespaces containing the data to be published is impressed onto a CD-ROM in plug-in format.

The CD-ROM is distributed to the target database by conventional means (e.g., by mail, overnight delivery, file transfer protocol). At the target site, the CD-ROM pluggable set is plugged into a target database, by loading the CD-ROM into a CD-ROM drive of the target computer system. After the set of tablespaces is thus available, the metadata contained on the CD-ROM is imported into the target database. Since the user data of the CD-ROM pluggable set is already in native format, the tablespaces in the pluggable set need not be converted or even copied and may remain in the CD-ROM driver, conserving disk space of the target site.

Plugging in a set of tablespaces without changing the datafiles in the tablespaces is possible because the tablespace-relative pointers in the datafiles need not be patched. Furthermore, with a "read-only" option, the database can remember that the information in the pluggable set is read-only by storing such an indication in the data dictionary and control files.

Other aspects of the invention allows for publishing a pluggable set on to other transportable media. For example, one embodiment of the invention publishes the pluggable set on a magnetic disk, such as a floppy disk. Another embodiment publishes the pluggable set on a magnetic table, such as a magnetic tape cartridge or magnetic tape reel.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of retrieving information from a computer database having a plurality of datafiles, said plurality of datafiles containing a plurality of data items, the method comprising the computer-implemented steps of:

logically partitioning said plurality of datafiles into a plurality of tablespaces;

storing references to data items that are contained in said plurality of datafiles as tablespace-relative pointers, wherein each of said tablespace-relative pointers indicates a location of a corresponding data item relative to the tablespace of said plurality of tablespaces that contains said corresponding data item;

locating a data item within said plurality of datafiles by performing the steps of:
reading a tablespace-relative pointer associated with said data item;
determining, based on an operating context, an identity of the tablespace of said plurality of tablespaces that contains said data item; and
locating said data item based on said tablespace-relative pointer and the identity of the tablespace.

2. The method of claim 1 wherein:

each data item of said plurality of data items is located at an absolute address; and the step of locating said data item based on said tablespace-relative pointer and the identity of the tablespace comprises the steps of:
determining said absolute address based on said tablespace-relative pointer and the identity of the tablespace; and
locating said data item based on said absolute address.

3. The method of claim 2 wherein:

each datafile is associated with a unique file number;

the absolute address of a data item includes the unique file number of the datafile that contains the data item and an offset into the datafile that contains the data item; and the step of determining said absolute address based on said tablespace-relative pointer and the identity of the tablespace includes the step of determining the unique file number of the datafile that contains the data item and an offset into the datafile that contains the data item based on said tablespace-relative pointer and the identity of the tablespace.

4. The method of claim 1 wherein:

each datafile in a tablespace is assigned a logical file identifier that is unique relative to the logical file identifiers assigned to other datafiles within the same tablespace;

the tablespace-relative pointers include a datafile portion and an offset portion;

the datafile portion of the tablespace-relative pointers specifies the logical file identifier of a corresponding datafile;

the offset portion specifies an offset into the corresponding datafile;

the step of locating said data item based on said tablespace-relative pointer and the identity of the tablespace includes the step of locating said data item based on the identity of the tablespace, said datafile portion and said offset portion.

5. The method of claim 1 wherein:

the identity of said tablespace is represented by a tablespace number;

the step of locating said data item based on said tablespace-relative pointer and the identity of the datafile that includes the data item includes the steps of:

determining whether said data item that corresponds to said tablespace-relative pointer and the tablespace number is present in a buffer cache;

if said data item that corresponds to said tablespace number and said tablespace-relative pointer is present in said buffer cache, then retrieving said data item from said buffer cache; and if said data item that corresponds to said tablespace number and said tablespace-relative pointer is not present in said buffer cache, then performing the steps of:
translating said tablespace number and said tablespace-relative pointer into an absolute file number,
opening a datafile uniquely identified by said absolute file number if not already opened,
retrieving said data item from said datafile at an offset specified in said tablespace-relative pointer, and
storing said data item, said absolute file number, and said tablespace-relative pointer in said buffer cache.

6. The method of claim 5 wherein the step of translating said tablespace-relative file number and said tablespace number into an absolute file number comprises the steps of:

getting a version number from a map, wherein said map has a busy flag and a latch;

after getting said version number, reading said busy flag;

if said busy flag is not set, then performing the steps of:
getting a mapped absolute file number from the map based upon said tablespace number and said tablespace-relative file number,
getting a new version number from said map, and
comparing said version number with said new version number;

if said busy flag is set or if said version number is not equal to said new version number, then performing the steps of:
obtaining said latch,
getting a mapped absolute file number from the map based upon said tablespace number and said tablespace-relative file number, and
releasing said latch; and returning the mapped absolute file number as said absolute file number.

7. The method of claim 6, wherein:

said map further comprises a hash table having a set of hash table entries, each hash table entry comprising a hash tablespace number, a hash tablespace-relative file number, and a hash absolute file number; and each step of getting a mapped absolute file number further comprises the steps of:
finding a hash table entry in the hash table such that the hash tablespace number of the hash table entry is equal to said tablespace number and the hash tablespace-relative file number of the hash table entry is equal to said tablespace-relative file number, and
returning the hash absolute file number of the hash table entry as said mapped absolute file number.

8. The method of claim 6, further comprising the steps of:

obtaining said latch;

after obtaining said latch, setting said busy flag;

after setting said busy flag, incrementing said version number;

after incrementing said version number, updating said map;

after updating said map, resetting said busy flag; and after resetting said busy flag, releasing said latch.

9. A database system, comprising:

a plurality of datafiles;

a plurality of tablespaces, forming a partition of and containing said plurality of datafiles;

a plurality of data items, contained in said plurality of datafiles; and a plurality of references to data items stored in said plurality of datafiles as tablespace-relative pointers, wherein each of said tablespace-relative pointers indicates a location of a corresponding data item relative to the tablespace of said plurality of tablespaces that contains said corresponding data item.

10. The database system of claim 9, wherein said database system is configured to locate a data item within said plurality of datafiles by performing the steps of:

reading a tablespace-relative pointer associated with said data item;

determining, based on an operating context, an identity of the tablespace of said plurality of tablespaces that contains said data item; and locating said data item based on said tablespace-relative pointer and the identity of the tablespace.

11. A computer readable medium having stored thereon sequences of instructions for retrieving information from a computer database having a plurality of datafiles, said plurality of datafiles containing a plurality of data items, said sequences of instructions including instructions for performing the steps of:

logically partitioning said plurality of datafiles into a plurality of tablespaces; and storing references to data items that are contained in said plurality of datafiles as tablespace-relative pointers, wherein each of said tablespace-relative pointers indicates a location of a corresponding data item relative to the tablespace of said plurality of tablespaces that contains said corresponding data item.

12. The computer readable medium of claim 11, further including instructions for locating a data item within said plurality of datafiles by performing the steps of:

reading a tablespace-relative pointer associated with said data item;

determining, based on an operating context, an identity of the tablespace of said plurality of tablespaces that contains said data item; and locating said data item based on said tablespace-relative pointer and the identity of the tablespace.

13. The computer-readable medium of claim 12 wherein:

each data item of said plurality of data items is located at an absolute address; and the step of locating said data item based on said tablespace-relative pointer and the identity of the tablespace comprises the steps of:

determining said absolute address based on said tablespace-relative pointer and the identity of the tablespace; and locating said data item based on said absolute address.

14. The computer-readable medium of claim 13 wherein:

each datafile is associated with a unique file number;

the absolute address of a data item includes the unique file number of the datafile that contains the data item and an offset into the datafile that contains the data item; and the step of determining said absolute address based on said tablespace-relative pointer and the identity of the tablespace includes the step of determining the unique file number of the datafile that contains the data item and an offset into the datafile that contains the data item based on said tablespace-relative pointer and the identity of the tablespace.

15. The computer-readable medium of claim 12 wherein:

each datafile in a tablespace is assigned a logical file identifier that is unique relative to the logical file identifiers assigned to other datafiles within the same tablespace;

the tablespace-relative pointers include a datafile portion and an offset portion;

the datafile portion of the tablespace-relative pointers specifies the logical file identifier of a corresponding datafile;

the offset portion specifies an offset into the corresponding datafile;

the step of locating said data item based on said tablespace-relative pointer and the identity of the tablespace includes the step of locating said data item based on the identity of the tablespace, said datafile portion and said offset portion.

16. The computer-readable medium of claim 12 wherein:

the identity of said tablespace is represented by a tablespace number; and the step of locating said data item based on said tablespace-relative pointer and the identity of the datafile that includes the data item includes the steps of:

determining whether said data item that corresponds to said tablespace-relative pointer and the tablespace number is present in a buffer cache;

if said data item that corresponds to said tablespace number and said tablespace-relative pointer is present in said buffer cache, then retrieving said data item from said buffer cache; and if said data item that corresponds to said tablespace number and said tablespace-relative pointer is not present in said buffer cache, then performing the steps of:

translating said tablespace number and said tablespace-relative pointer into an absolute file number, opening a datafile uniquely identified by said absolute file number if not already opened, retrieving said data item from said datafile at an offset specified in said tablespace-relative pointer, and storing said data item, said absolute file number, and said tablespace-relative pointer in said buffer cache.

17. The computer-readable medium of claim 16 wherein the step of translating said tablespace-relative file number and said tablespace number into an absolute file number comprises the steps of:

getting a version number from a map, wherein said map has a busy flag and a latch;

after getting said version number, reading said busy flag;

if said busy flag is not set, then performing the steps of:

getting a mapped absolute file number from the map based upon said tablespace number and said tablespace-relative file number, getting a new version number from said map, and comparing said version number with said new version number;

if said busy flag is set or if said version number is not equal to said new version number, then performing the steps of:
obtaining said latch,
getting a mapped absolute file number from the map based upon said tablespace number and said tablespace-relative file number, and
releasing said latch; and
returning the mapped absolute file number as said absolute file number.

18. The computer-readable medium of claim 17, wherein:
said map further comprises a hash table having a set of hash table entries, each hash table entry comprising a hash tablespace number, a hash tablespace-relative file number, and a hash absolute file number; and
each step of getting a mapped absolute file number further comprises the steps of:
finding a hash table entry in the hash table such that the hash tablespace number of the hash table entry is equal to said tablespace number and the hash tablespace-relative file number of the hash table entry is equal to said tablespace-relative file number and
returning the hash absolute file number of the hash table entry as said mapped absolute file number.

19. The computer readable medium of claim 17, further comprising the steps of:
obtaining said latch;
after obtaining said latch, setting said busy flag;
after setting said busy flag, incrementing said version number;
after incrementing said version number, updating said map;
after updating said map, resetting said busy flag; and
after resetting said busy flag, releasing said latch.

* * * * *